United States Patent [19]

Manassen et al.

[11] 4,315,973

[45] Feb. 16, 1982

[54] PHOTOELECTROCHEMICAL CELL ASSEMBLY HAVING ELECTROLYTE CONTACTS BETWEEN SEMICONDUCTOR SURFACES

[75] Inventors: Joost Manassen; Gary Hodes; David Cahen, all of Rehovot, Israel

[73] Assignee: Yeda Research and Development Co., Ltd., Rehovot, Israel

[21] Appl. No.: 180,472

[22] Filed: Aug. 22, 1980

[30] Foreign Application Priority Data

Nov. 20, 1979 [IL] Israel ............................. 58747

[51] Int. Cl.³ ............................................. H01M 6/36
[52] U.S. Cl. ..................................... 429/111; 204/275
[58] Field of Search .................. 429/111; 204/275, 242

[56] References Cited

U.S. PATENT DOCUMENTS

| | | | |
|---|---|---|---|
| 4,021,323 | 5/1977 | Kilby et al. | 204/129 |
| 4,061,555 | 12/1977 | Miyatani et al. | 204/242 |
| 4,090,933 | 5/1978 | Nozik | 204/129 |
| 4,094,751 | 6/1978 | Nozik | 204/80 |
| 4,136,436 | 1/1979 | Kilby et al. | 29/572 |

OTHER PUBLICATIONS

G. W. Murphy, "Model Systems in Photoelectrochemical Energy Conversion", *Solar Energy*, vol. 21, pp. 403–407 (1978).

*Primary Examiner*—Aaron Weisstuch
*Attorney, Agent, or Firm*—Sandler & Greenblum

[57] ABSTRACT

An assembly comprising at least two semiconductor electrodes, each of the semiconductor electrodes having a positive and negative surface, and an electrolyte for electrically connecting the surfaces of opposite polarity of said semiconductor electrodes, the electrolyte comprising at least one redox couple capable of a reversible redox reaction with one of said surfaces of opposite polarity of said semiconductor electrodes whereby the composition of said electrolyte remains substantially unchanged as charge is passed between said electrodes.

An electrolysis assembly for electrolyzing a liquid comprising an electrolysis compartment connected with the above assembly.

14 Claims, 7 Drawing Figures

U.S. Patent    Feb. 16, 1982    Sheet 1 of 2    4,315,973
FIG.1 PRIOR ART
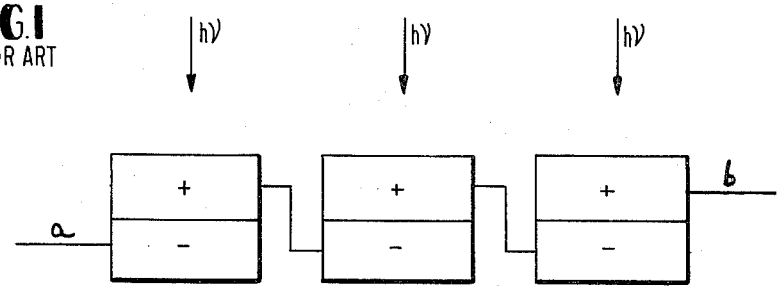
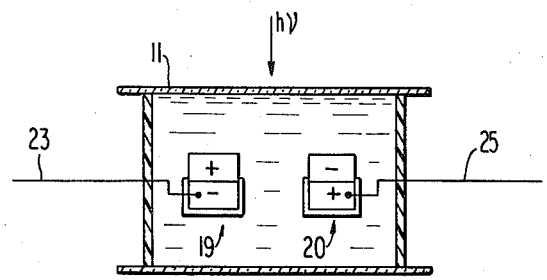
FIG.2
FIG.3A
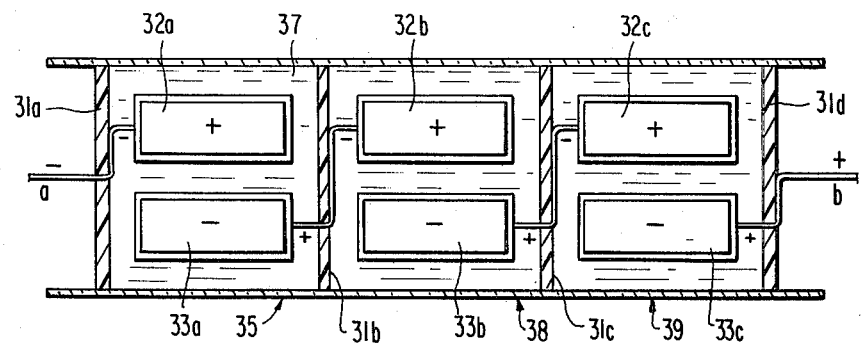
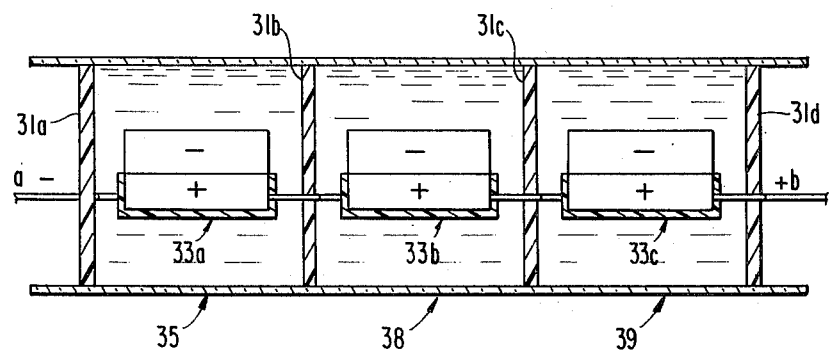
FIG.3B U.S. Patent Feb. 16, 1982 Sheet 2 of 2 4,315,973

PHOTOELECTROCHEMICAL CELL ASSEMBLY HAVING ELECTROLYTE CONTACTS BETWEEN SEMICONDUCTOR SURFACES

BACKGROUND OF THE INVENTION

1. Field of the Invention

The present invention relates to a semiconductor assembly comprising novel means for electrically connecting semiconductor surfaces which limits the use of external wiring and ohmic contacts when connecting semiconductor devices. The invention further relates to an electrolysis assembly and method which makes use of the novel connecting means.

2. Description of Prior Art

As may be seen from FIG. 1, semiconductor devices have conventionally been connected in series by hardwiring the positive and negative surfaces to one another so as to form a circuit. As shown, radiation striking e.g. the positive surfaces of the semiconductor devices generates a current which is transmitted from device to device by wires or the like. In order for the system to operate effectively, however, the illuminated surfaces, in the embodiment illustrated, must conduct electrical current well. Yet in many cases, the surfaces are not sufficiently conductive and it is, therefore, necessary to introduce grids of an electrically conductive material within or on the surface of the semiconductors so as to improve their conductivity.

U.S. Pat. Application Ser. No. 141,795 filed Apr. 21, 1980 and entitled ELECTROCHEMICAL CELL BATTERY AND METHOD OF ASSEMBLING SAME discloses a novel technique for connecting photoelectrical cells in series by using bipolar electrode connections. Such a system is useable for interconnecting cells of the type disclosed in U.S. Pat. No. 4,064,326. According to the application, the cells are separated by electrically conductive separators which connect the photoelectrode and counterelectrode of two adjacent cells. The cells are, therefore, connected in series without the use of external contacts. Although the system avoids the use of external contacts, the electrolyte used in the system is not used to electrically connect discrete cells but acts as an electrolyte in conjunction with the photoelectrode and counterelectrodes of each cell.

Most photovoltaic devices, be they p/n or metal/semiconductor cells, are current generators rather than voltage generators and, therefore, for practical applications it is necessary to connect a plurality of cells in series to achieve an acceptable working voltage. In practice, this is accomplished by wiring and soldering which may sometimes pose a problem when appreciable quantities of current must pass through the wire under the relatively low voltage conditions which are present. Sometimes, as was noted above, it is even impossible to make good electrical contact by means of conventional electrical connections with the photoactive surface.

U.S. Pat. Nos. 4,021,323 and 4,136,436 disclose a solar energy conversion system.

Upon illumination the devices generate a voltage of about 1 v. thereby resulting in electrolysis of a liquid. For higher voltages complicated connections are necessary.

SUMMARY OF THE INVENTION

It is, therefore, an object of the invention to provide a system for electrically connecting semiconductor devices and the like.

It is a further object of the invention to electrically connect surfaces of opposite polarity of two or more semiconductors by means of an electrolyte whose composition remains substantially unchanged.

It is a further object of the invention to connect semiconductor devices by means of a redox couple containing electrolyte whereby the positive and negative surfaces of two semiconductor electrodes are placed in electrical contact for purposes of conducting an electrical current therethrough. The conducting positive and negative surfaces are exposed to the electrolytic solution capable of undergoing reversible redox-reactions while the respective remaining negative and positive surfaces are isolated from contact with the solution and may be connected so as to form a circuit.

While in its most basic form, the invention relates to the connection of a pair of semiconductor devices in a single compartment, it is to be understood that the invention is further directed to the use of a plurality of compartments each comprising a pair of semiconductor electrodes, adjacent compartments being connected to one another in series.

Thus, one benefit of the invention is that surfaces which were insufficiently conductive or were previously rendered more conductive by means of a grid may be simply exposed to a redox containing electrolyte solution thereby obviating the need for the grid while nevertheless achieving improved electrical conduction.

It is yet a further object of the invention to utilize the above principles to provide the necessary voltage for electrolyzing fluids such as liquids by means of photoactive semiconductor junctions.

According to the inventive electrolysis method, two photoactive semiconductor electrodes, each having positive and negative surfaces are connected in series by exposing them to a redox electrolyte thus forming an assembly. Two additional electrodes are connected with one or several series connected assemblies and brought into contact with the liquid to be electrolyzed. Illumination of the electrodes results in electrolysis of the fluid with which the additional electrodes are brought into contact.

According to the invention, the semiconductor electrodes may comprise a photoactive metal/semiconductor junction, or a metal/insulator/semiconductor junction.

BRIEF DESCRIPTION OF THE DRAWINGS

With reference to the annexed drawings:

FIG. 1 illustrates a conventional system for electrically connecting photovoltaic cells in series;

FIG. 2 illustrates one embodiment for electrolytically connecting positive and negative surfaces;

FIG. 3A illustrates a top planar view of an assembly wherein pairs of electrolytically connected semiconductor devices are assembled in series by bipolar connections;

FIG. 3B illustrates a side elevational view of the assembly of FIG. 3A.

DESCRIPTION OF PREFERRED EMBODIMENTS

Figure 4A:
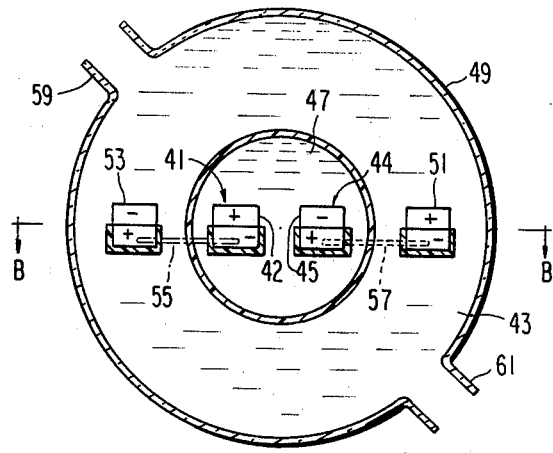
FIG. 4A is a cross sectional view of an electrolysis device.

As may be seen with reference to FIG. 2, a compartment 11 is illustrated comprising semiconductor electrodes 19 and 20. The semiconductor electrodes comprise junctions 21 and 22 respectively. The negative portion of semiconductor 19 is connected to lead 23 while the positive portion of semiconductor 20 is connected to a lead 25. The surfaces of the portions of the semiconductors connected to the leads are electrically isolated from the electrolyte 27 within the container such that only the positive portion of semiconductor 19 and the negative portion of semiconductor 20 are in contact with the electrolyte so that electrical current may be conducted therebetween. When the container is irradiated, opposite redox reactions occur at the illuminated portions of both electrodes, and as a result the net solution composition does not change. However, current is conducted and the voltage measured across poles 23 and 25 is equal to the sum of the voltage generated by individual semiconductors, thereby corresponding to the situation in which the individual semiconductors were hardwired to one another.

The above principle may be combined with the principle disclosed in the U.S. Pat. Application referred to above, the disclosure of which is hereby incorporated by reference, to result in a preferred embodiment of the invention which is schematically illustrated in FIG. 3A.

In this embodiment of the invention, a pair of electrodes 32a and 33a is positioned in a compartment 35 comprising electrolyte 37. Electrode 32a has the positive portion of its junction exposed to the liquid electrolyte as well as the light source while its negative portion (not shown) is electrically isolated from the liquid electrolyte and is connected to end separator 31a. Electrode 33a in cell 37 has its negative portion exposed to the electrolyte and to the light source while its positive portion is electrically isolated from the electrolyte and connected to intermediate separator 31b. Each of cells 35, 38 and 39 are arranged in series with semiconductor electrodes 33a, 33b, and 33c having their positive portions electrically isolated from the liquid and wired to the separator plates 31b, 31c, and 31d. Electrodes 32a, 32b, and 32c in each of cells 35, 38, and 39 are reversed with respect to electrode semiconductors 33a, 33b, and 33c such that their lower negative portions are electrically isolated from the electrolyte and are hardwired to separators 31 while their upper positive portions have a positive surface exposed to the electrolytic redox couple containing liquid. The isolated portions of the electrodes may be covered with an insulating substance such as tar or a suitable organic or inorganic polymer.

When an assembly of the type illustrated in FIGS. 3a and 3b is irradiated and a voltage is measured across terminals a and b, the voltage measured is the sum of the voltages of each individual junction, while the current is that of only one cell. The net effect, therefore, is that of connecting the cells electrically in series.

Such an assembly finds particular value when it is not possible to make good electrical contact with the semiconductor surface such as, for instance, when the semiconductor is built of very polycrystalline or amorphous particles. In U.S. Pat. Nos. 4,021,323 and 4,136,436, for instance, p/n junctions are described which are formed by embedding p/n junctions in the form of small spheres in a wax or polymer layer. On the dark or non-irradiated side of the semiconductor, the spheres can be connected by a metal layer; however, this is not possible on the irradiated side. Thus, the principle of the instant invention may be applied to such a system such that the electrolyte contacts the exposed surface for purposes of providing electrical contact and increasing the voltage. Such contact would have been impractical using conventional wiring.

The electrolyte solution used should be non-corrosive with respect to the semiconductor surface (or surface covered with a metallic layer), and must have an adequate ionic conductivity. Water is a preferred solvent, when corrosion is no problem.

The electrolyte solution comprises a redox couple whose choice is dictated by its solubility and its electrochemical kinetics at the semiconductor surface. If the semiconductor surface can tolerate a low pH, most metal ions of varying valency may be used. Where neutral or basic electrolyte solutions must be used, the choice is less varied but a wide range of metal complexes or anions of varying valency may be used.

Where water does not pose a problem, suitable organic solvents having high concentrations of ionic species may be used. Many combinations of redox couples and solvent are known from organic electrochemistry. By virtue of the fact that current densities in photovoltaic systems without concentration of the light are rarely more than 20–30 mA/cm$^2$ at maximum power conditions, resistance losses will not be excessive under the proper conditions.

Many redox systems are colored and will absorb a portion of the incoming radiation. Although in some cases, some absorption losses may be tolerated, redox couples which do not color the solution are preferably used.

The resistance of the electrolyte solutions is not only a function of the mobility and concentration of the ions therein, but also a function of their rate of reaction at the semiconductor surfaces. Since many semiconductor surfaces are rather sluggish as electrodes in electrochemical reactions, it is preferable in many cases to add a small quantity of electrocatalyst at the semiconductor/solution interface. This may best be done by depositing a small quantity of a metal onto the semiconductor, which metal does not corrode in the liquid medium being used. The coating may be applied by a variety of methods such as vacuum evaporation, sputtering, electroplating and the like. Even very small quantities suffice for obtaining the required catalytic effects. Additionally, in many cases it is possible to prevent corrosion of the surface by covering it with a homogeneous layer of metal thin enough to transmit most of the incoming light (this being a necessity when metal semiconductor cells are to be used).

From the above discussion it should be clear that the system chosen must be adapted to each particular case. For aqueous acidic solutions an $Fe^{+2}/Fe^{+3}$ redox system is suitable. Although $Fe^{+3}$ ions do indeed absorb some radiation, their extinction coefficient is low. In alkaline solutions, polysulfide systems such as $S=/S$ are good systems in spite of the fact that some radiation is absorbed in the solution by virtue of the fact that it is colored.

In organic systems, solvents such as acetonitrile or dimethylformamide are suitable. Such solvents are made conductive by the dissolution of large quantities of salts therein. As to the redox system, a wide choice of metal complexes are soluble in organic media. Suitable salts are those of lithium or quaternary ammonium bases. Where corrosion is less of a problem, molten salt may also be used.

A mixture of water and organic solvents is also possible, the limitation once again being whether the semiconductor surface corrodes or not upon exposure to the liquid phase.

The embodiment of the invention illustrated in FIGS. 3A and 3B is preferred when one desires only to generate electrical power. However, in many instances it is preferred to use the current generated to cause a chemical reaction such as the electrolysis of water or some other chemical substance.

Figure 4B:
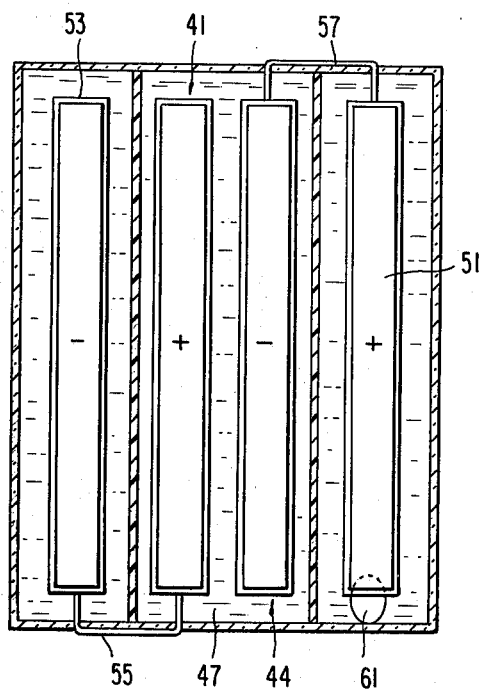
FIG. 4B is a top planar view along line B—B of FIG. 4A.

While the assembly of FIGS. 3A and 3B may be connected via leads a and b and contacts to a suitable electrochemical cell for purposes of carrying out such reactions, it is more economical and in some cases preferable to perform the chemical reaction within the photocell itself. FIGS. 4A and 4B illustrate an embodiment of the invention which makes this possible.

As seen in FIG. 4A, two concentric tubes are used. Inner transparent tube 43 contains two electrode junctions 41 and 44, one of which has a positive side 42 exposed while the other has negative side 45 exposed, the remaining unexposed positive and negative surfaces being electrically isolated, as was discussed above. Inner compartment 43 is filled with a suitable redox containing electrolyte solution 47 and sealed. Two additional electrodes are positioned in an outer annular compartment 49, once again one of which, 51, has its positive side and the other, 53, its negative side exposed. The positive portion of electrode 53 is electrically connected by means of wire 55 to the negative portion of electrode 42 within inner tube 43. In a like fashion the positive and isolated portion of electrode 45 is electrically connected by means of contact connection 57 to the negative isolated portion of electrode 51. Openings 59 and 61 are provided in the outer annular compartment which is transparent to irradiation. When irradiated, a voltage is created in the outer or electrolysis compartment which, in the embodiment illustrated, is equal to four times the voltage of a single junction. A suitable liquid which is to be electrolyzed is circulated through openings 59 and 61 acting as inlets and outlets while electrochemical reactions take place on the exposed semiconductor surfaces 53 and 51 in the electrolysis compartment. When using silicon p/n junctions, an embodiment of the type illustrated in FIGS. 4A and 4B is suitable for electrolysing water without the necessity of building a separate electrolysis plant. As may be seen from FIG. 4B, the various electrodes within the various transparent containers are preferably arranged such that they receive maximum exposure and radiation.

Figure 5:
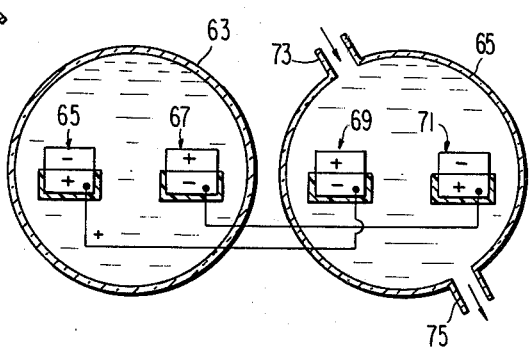
FIG. 5 is an additional embodiment of the electrolysis assembly.

Although two concentric tubes have been shown in FIGS. 4A and 4B, it is likewise possible to use two adjacent tubes as shown in FIG. 5 to achieve a similar result. As may be seen in FIG. 5, two separate compartments 63 and 65 each containing junction electrodes 65, 67 and 69, 71 are disclosed. Upon irradiation, the liquid to be electrolyzed is circulated through openings 73 and 75, while compartment 63 remains sealed.

Quite obviously, a wide variety of alternative configurations is also possible based on the above principles.

Electrodes may be either based on solid-state solar cells (e.g. p-n Si, $Cu_2S/CdS$), with a protective electrically conducting layer (thin metal or conducting oxide) on the surfaces exposed to the electrolyte, if necessary, or photoelectrodes of one semiconductor type, as described for photoelectrochemical cells, such as cadium chalcogenides, GaAs, InP, Si, etc.

EXAMPLE

Two monocrystalline silicon p/n junction electrodes constructed in a conventional fashion, one of which is mainly n-type with a thin p-type layer on top, the other being mainly p-type, with a thin n-type layer on top, are positioned in a cell. The transparent sides of each of the electrodes is covered with a 100 Angstrom thick platinum layer applied by means of vacuum evaporation. The unexposed portions of the junction electrodes are connected via ohmic contacts by conventional means with electrically conducting connections and are covered with an insulating layer of tar. Both electrodes have a surface area of one square centimeter and are enclosed in a glass tube containing one molar $FeSO_4$/$Fe_2(SO_4)_3$ aqueous solutions of pH3. In this case, at the metallized n-type electrode, the reaction occurring is $Fe^{3+}(Fe_2(SO_4)_3) \rightarrow Fe^{2+}(FeSO_4)$, while the reverse reaction takes place at the metallized p-type surface.

Upon exposure to sunlight having an intensity of 85 $mW/cm^2$ a voltage of 1.02 volts is measured between the electrical connections while the cells generate a current of 16 $mA/cm^2$. The measured voltage corresponds to that of the two silicon p/n junctions connected in series.

Although the invention has been described with respect to particular means and materials, it is to be understood that the invention is not limited to the particulars disclosed, but extends to cover all embodiments falling within the scope of the claims. Thus, for example, although particular redox couples, electrolytes and the like have been disclosed, the invention is not limited to the particulars disclosed but extends to all equivalents falling within the scope of the claims.

List of possible redox electrolytes (Table I)

$Fe^{2+}/Fe^{3+}$
$Fe(CN)_6^{4-}/Fe(CN)_6^{3-}$
$X^-/X$ (where X ic Cl, Br, I)
$H/H^+OH^-/H_2O$
$Cr^{2-}/Cr^{3+}$
$S_x^{2-}/S_x$
$Sn^{2+}/Sn^{4+}HSnO_2^-/Sn(OH)_6^{2-}$
$V^{3+}/V^{4+}$

What is claimed is:

1. An assembly comprising at least two separated semiconductor electrodes, each of said semiconductor electrodes having a positive and negative surface with a photoactive junction therebetween, one of said surfaces of each electrode being exposed for contact with an electrolyte and the other being isolated from said electrolyte, and said electrolyte for electrically connecting in series said exposed surfaces of opposite polarity of said at least two semiconductor electrodes, said electrolyte comprising at least one redox couple capable of a reversible redox reaction with one exposed surface of each of said semiconductor electrodes whereby the composition of said electrolyte remains substantially unchanged as charge is passed between said electrodes.

2. The assembly as defined by claim 1 wherein said electrolyte comprises water.

3. The assembly as defined by claim 1 wherein said electrolyte is an aqueous salt solution.

4. The assembly as defined by claim 1 wherein said electrolyte is a conducting organic solvent.

5. The assembly as defined by claim 4 wherein said electrolyte comprises said conducting organic solvent in combination with water.

6. The assembly as defined by claim 1 wherein said electrolyte is a molten salt.

7. The assembly as defined by claim 1 wherein said redox couple is chosen from Table I.

8. The assembly as defined by claim 1 wherein at least one of said semiconductor electrodes comprises a photoactive p-n junction and wherein one of the surfaces of each of said photoactive p-n junction semiconductor electrodes is positioned for exposure to 9. The assembly as defined by claim 1 wherein each of said semiconductor electrodes comprises a photoactive metal/semiconductor junction.

10. The assembly as defined by claim 1 wherein each of said semiconductor devices comprises a metal/insulator/semiconductor junction.

11. The assembly as defined by either of claims 1 or 8 wherein each of said semiconductor electrodes comprises a semiconductor surface coated with a thin metal catalyst layer in contact with said electrolyte.

12. The assembly as defined by any one of claims 1, 3, 8, 9 and 10 comprising a plurality of compartments each having a positive and negative pole and wherein two of said semiconductor electrodes are positioned in each of said compartments, and whereby said compartments are electrically connected in series such that the negative pole of one compartment is connected to the positive pole of the adjacent compartment.

13. The assembly as defined by claim 1 wherein one pair of said semiconductor electrodes is positioned within an interior compartment comprising a redox couple containing electrolyte whereby the negative surface of one of said semiconductor electrodes and the positive surface of the other of said semiconductor electrodes are in contact with said redox couple containing electrolyte, said interior compartment being surrounded by an exterior compartment, said exterior compartment comprising an electrolizable liquid and two additional semiconductor electrodes, the positive surface of one of said semiconductor electrodes in said outer compartment being isolated from said liquid in said outer compartment and being electrically connected to the negative surface of one of said semiconductor electrodes within said inner compartment, and the negative surface of the other of said semiconductor electrodes in said outer compartment being isolated from said liquid in said outer compartment and being electrically connected to the positive surface of the other of said semiconductor electrodes in said inner compartment.

14. The assembly as defined by claim 13 wherein said outer compartment comprises an inlet for feeding liquid to said outer compartment and an outlet from said outer compartment.

* * * * *

UNITED STATES PATENT AND TRADEMARK OFFICE
CERTIFICATE OF CORRECTION

PATENT NO. : 4,315,973

DATED : February 16, 1982

INVENTOR(S) : Joost MANASSEN et al.

It is certified that error appears in the above—identified patent and that said Letters Patent is hereby corrected as shown below:

Column 6, line 45, "$Cr^{2-}/Cr^{3+}$" should be --$Cr^{2+}/Cr^{3+}$--.

Column 7, line 12, after "exposure to" insert --illumination as well as to said electrolyte.--

Column 7, lines 24-25, "1, 3, 8, 9 and 10" should be --1, 3-8, 9 and 10--.

Signed and Sealed this

Fourth Day of May 1982

[SEAL]

Attest:

GERALD J. MOSSINGHOFF

Attesting Officer     Commissioner of Patents and Trademarks